Inventor
Felix Alexander Joseph
By D. Anthony Usina
His Attorney

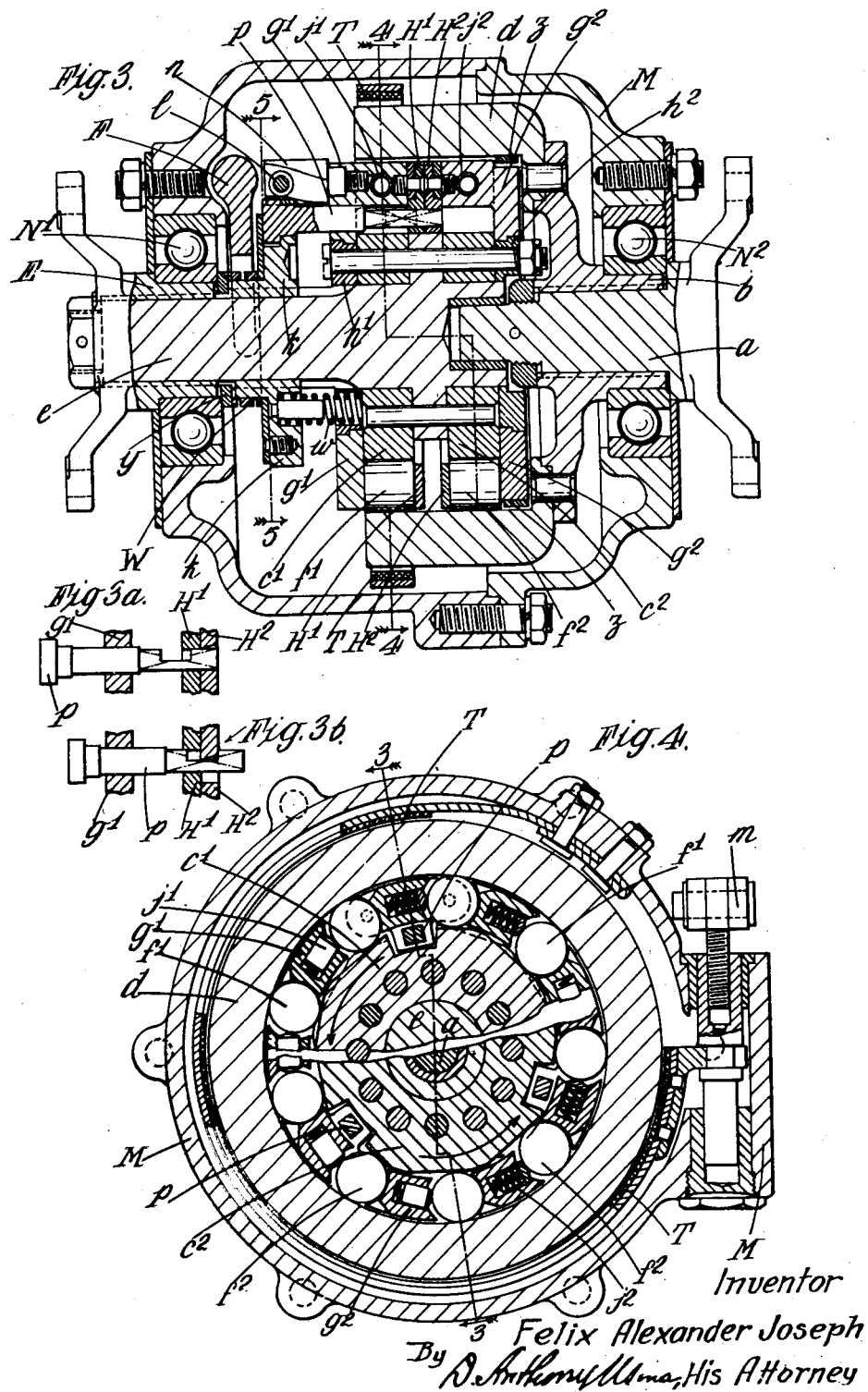

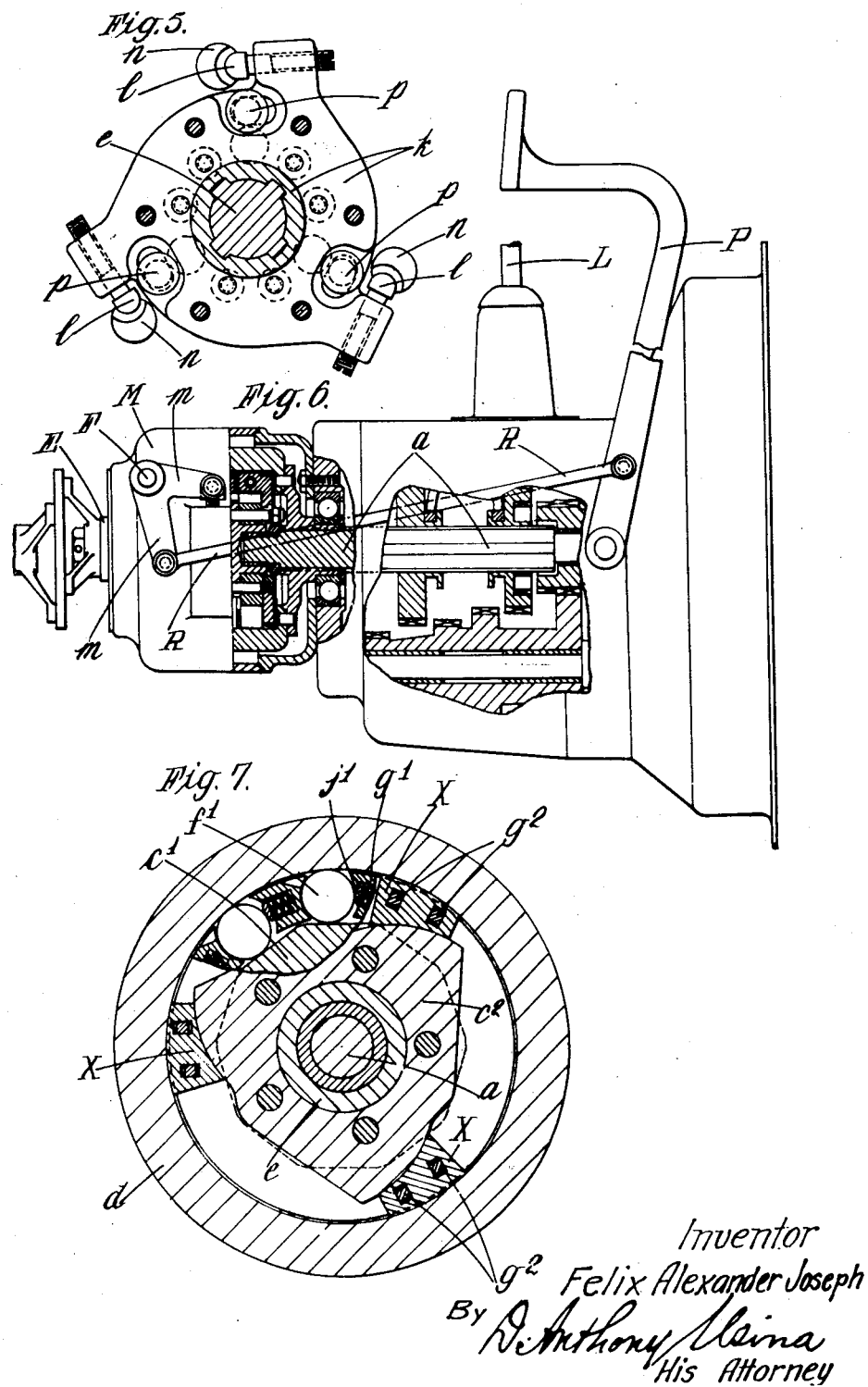

Patented June 25, 1929.

1,718,359

UNITED STATES PATENT OFFICE.

FELIX ALEXANDER JOSEPH, OF LONDON, ENGLAND.

CLUTCH AND THE LIKE.

Application filed May 8, 1926, Serial No. 107,557, and in Great Britain June 13, 1925.

This invention relates to clutches, or devices for enabling one member, which is adapted to rotate, to be locked to, or unlocked from, another member while both members or either member may be rotating, and has for its objects improvements therein and relating thereto.

Apparatus made according to the present invention comprises the elements of two unidirectional clutches adapted to act in opposite directions and normally as a bidirectional coupling, provided with means for unidirectional uncoupling. Means may be provided for automatically restoring bidirectional coupling when synchronization between the driving and driven members is attained. In one form of the invention the said means for automatically restoring bidirectional coupling without shock comprises a control member which is permitted a limited angular movement or play with respect to the driven member. The condition of unidirectional or bidirectional coupling of the device is governed by the position, within its play, of the control member.

I wish it to be understood that for the purposes of this specification the term "coupling" is used to describe a device for locking together two independent members so that they are compelled to share the same rotation at all times irrespective of which is momentarily a driving member.

Furthermore, it is to be understood that when a unidirectional clutch comprises a cam member, rollers or other wedging members and a member whose working surface is a figure of revolution, the last named member may be hereinafter referred to as the "abutment member".

The said bidirectional coupling may comprise two unidirectional clutches each of any type whatever capable of acting in opposite directions between the driving and driven members of the apparatus. When these unidirectional clutches are of the "silent" type embodying wedges, rollers or balls or other gripping members (hereinafter referred to as "gripping members") means are provided for controlling the gripping members of one unidirectional clutch with respect to those of the other unidirectional clutch so that both sets of gripping members are unable to assume their gripping positions at the same instant which might result in their becoming tightly jammed, thereby preventing the easy declutching of the apparatus.

Owing to the wedging action that takes place when a torque in one direction is applied, the corresponding gripping members and coacting parts of the device tend to be slightly distorted, resulting in a slight relative angular movement between the driving and driven members. At the same time the other set of gripping members (unless means are provided for preventing them from doing so) are ready to grip instantaneously as soon as relative movement in the reverse direction takes place. Consequently, when the torque first referred to is removed, the first set of wedges and coacting parts of the device tend to revert to their former dimensions, and can only do so by a slight relative return angular movement taking place in the reverse direction between the driven and driving members, which in turn produces a distortion on the other set of rollers and the coacting parts of the device, with the result that when the torque is removed both sets of gripping members and coacting parts are left in a state of strain and both sets of gripping members become wedged, thereby rendering declutching difficult. In one form of such means for preventing jamming each unidirectional clutch is provided with a cage which contains and locates the gripping members of that unidirectional clutch so that movement of the cage relative to that member (driving or driven) of the apparatus whose rotation it shares when the apparatus is declutched and which member may be polygonal or otherwise shaped, determines the free or operative positions of the gripping members. By coupling the two cages together so that when one set of gripping members is in the operative position the other set is held just free and vice versa (permitting in effect a small amount of "backlash" between the driving and driven members of the device) the possibility of jamming is obviated while at the same time the device functions as a coupling. In practice, the extent of such "backlash" can be made indefinitely small and need not exceed that which exists between two members splined to one another.

In one form of apparatus made in accordance with this invention, means are provided to enable the same rollers to come into action in either direction of rotation, and to be thrown out of action at will.

Means may also be provided for enabling the bidirectional coupling to be thrown into action and the coupling together thereby of the driven and driving members of the apparatus to take place without shock. In one form of bidirectional coupling provided with such means, the declutching means is only partial, i. e., when operated may be such as to temporarily convert the clutch into a unidirectional clutch so that the normally driven member may over-run the normally driving member like an ordinary "free-wheel", while the driving member remains capable at all times of driving the driven member in one direction of rotation. To enable the driving and driven members to be coupled up bidirectionally, without shock, means are provided which automatically insure that this takes place only when the normally driving member drives the normally driven member, the "free-wheel" property of the clutch ensuring that when this occurs the speed of the driving member is substantially equal to the speed of the driven member.

In one form of clutch provided with such means, two unidirectional clutches of the silent type are employed, the declutching means consisting of a member slidable longitudinally which in its normal position permits both unidirectional clutches to function and in its advanced and operative position throws one of the unidirectional clutches into neutral. Means are provided for automatically retaining the said longitudinally slidable member in its advanced and operative position so long as the driven member over-runs the driving member and automatically causing it to return to its normal position as soon as the normally driving member once more drives the normally driven member.

This invention may be employed to facilitate the changing of gears in gearing mechanism, particularly in the gear boxes of automobiles. For this purpose, a device, made according to this invention and herein described, may be coupled between the gear box and the load (i. e., between the gear box and the road wheels in the case of an automobile), thereby permitting the load to over-run the gear box at the will of the operator. At the same time the ordinary friction clutch between engine and gear-box, as commonly provided on automobiles, enables the gear-box to be disconnected from the engine, so that in combination with means for arresting or retarding all the rotating parts of the gear-box, gears can be changed easily and silently, while engine and load are revolving independently.

The drawings filed herewith illustrate some forms of apparatus made in accordance with this inventon, and of them:

Fig. 3 is a longitudinal section taken on line 3—3, Fig. 4, and Figs. 4 and 5 transverse sections taken on lines 4—4 and 5—5, Fig. 3, respectively, of another form of the invention, employing right and left hand unidirectional clutches and provided with means for automatic clutching without shock.

Figs. 3$^a$ and 3$^b$ show portions of the declutching means in detail.

Fig. 6 is a longitudinal view, partly in section and partly in elevation of apparatus, similar to that illustrated in Figs. 3 to 5, assembled on an automobile.

Fig. 7 is a transverse section of a particular form of the device.

I desire it to be clearly understood that although for convenience, I have illustrated some special forms of unidirectional clutches, any form of unidirectional clutch could be employed in apparatus constructed in accordance with this invention.

Figure 1:
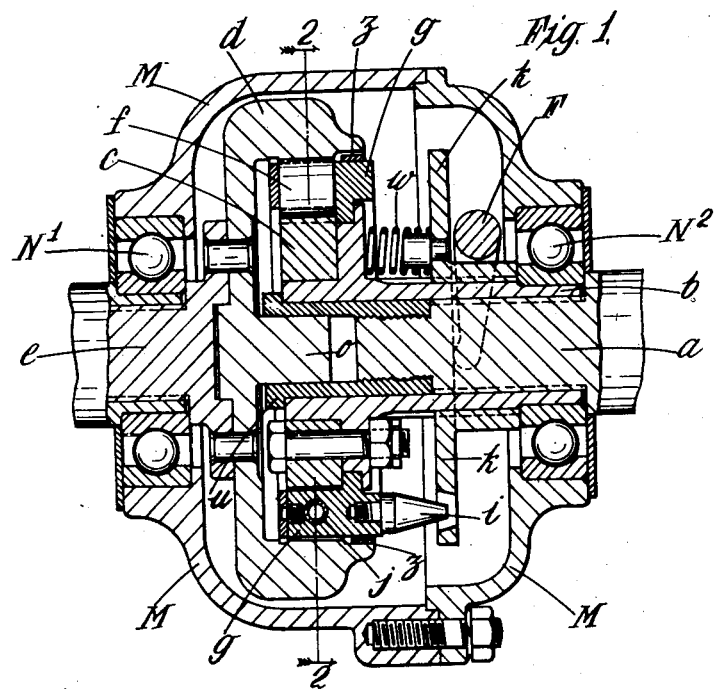
Fig. 1 is a longitudinal section taken on line 1—1, Fig. 2.
Figure 2:
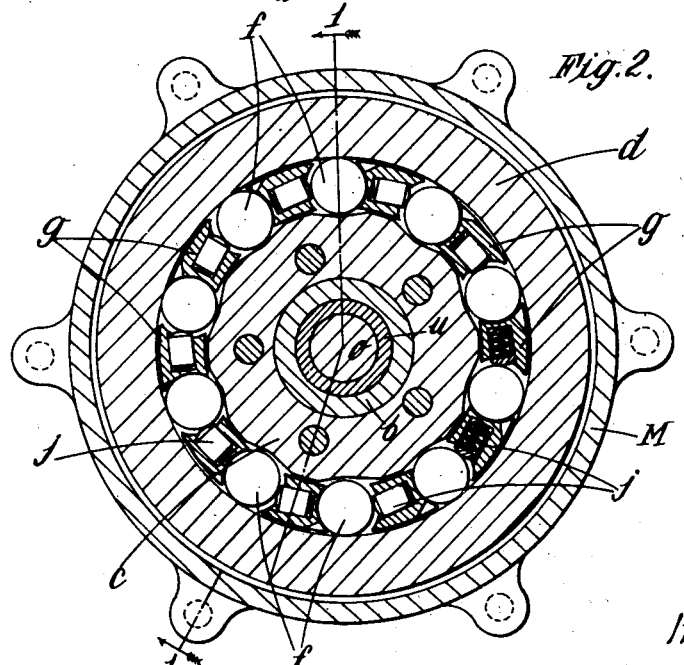
Fig. 2 is a transverse section taken on line 2—2, Fig. 1, of a simple form of the type of clutch to which the invention can be applied employing only one set of rollers.

Referring to Figs. 1 and 2, $a$ is the normal driving shaft to which is splined the sleeve $b$ carrying the cam $c$, which, in transverse section, is of undulating or flat-toothed form. $d$ is a hardened steel drum made integral with, or riveted to, the normally driven member $e$. Rollers $f$ are carried by a bronze cage $g$ and are interposed between the cam $c$ and the drum $d$, the undulations or flat-teeth of the cam $c$ being of such shape that a very slight movement either way of the cage $g$ relative to the cam $c$ results in the rollers $f$ getting into their active gripped or wedged positions between the drum $d$ and the cam $c$. By means of flat bronze springs $z$ fixed to the cage $g$ and pressing on the drum $d$, the cage $g$ tends to revolve with the drum $d$ and consequently any relative movement between the cam $c$ and drum $d$ away from one gripped position ensures the rollers being carried by the cage into their other gripped position, so that the clutch functions as a bidirectional coupling, coming into operation automatically in either direction of rotation and irrespective of whether the driving shaft $a$ drives or is driven by the shaft $e$ (i. e. irrespective of whether the power drives the load or whether the load overruns the source of power). Spring plungers $j$, housed in the cage $g$, serve to keep the rollers $f$ in their correct positions, and thereby to distribute the load uniformly among them.

Slidable on splines on sleeve $b$ is mounted the plate $k$ provided with a number of conical holes which co-act, in its advanced position, with tapered pegs $i$ mounted on the cage $g$. A fork F operated by an external crank (not shown) enables the plate $k$ to be slidden towards the cage $g$, while springs $w$ ensure the return of $k$ to its normal position (as shown in Fig. 1) when its holes are clear of the tapered pegs $i$. When slidden towards $g$, the holes of the plate co-act with the tapered pegs $i$ and impart a slight angular motion to the cage $g$ relative to the cam $c$, thereby pulling the rollers out of either of their active or gripped positions and positively declutching the apparatus. A sleeve-nut $u$ serves to locate the sleeve $b$ on the shaft $a$, and at the same time receives the spigot $o$ made integral with the drum $d$. The whole apparatus is enclosed in a casing M which is supported on bearings $N^1$ and $N^2$.

Referring to Figs. 3, 3$^a$, 3$^b$, 4 and 5, $a$ is the normally driving member which for forward drive rotates in an anti-clockwise direction when looking towards the driving member $a$ to which is splined a sleeve $b$ carrying a drum $d$ riveted to it. $e$ is the normally driven shaft to which at one end is splined the sleeve E of the driven coupling. To a flange at the other end of $e$ is riveted two similar polygon-shaped cams, $c^1$ and $c^2$. Between the cams and drum $d$ are interposed two sets of rollers, $f^1$ and $f^2$, each carried on a separate cage $g^1$ and $g^2$, supported on the clamping plates, $h^1$ and $h^2$. In addition to its function as a cage $g^2$ acts as a controlling member. These two sets of rollers have their active positions on opposite corners of the cams and consequently are each capable of transmitting effort in one direction of rotation. Each roller is located in its cage by means of spring plungers $j^1$ and $j^2$ carried on each cage, so as to ensure a uniform distribution of the load among all the rollers of each set. Plates $H^1$ and $H^2$ riveted to the cages $g^1$ and $g^2$ serve to hold the rollers in their cages. A member $k$ splined to and slidable on shaft $e$, carrying three adjustable pegs $l$ (Figs. 3 and 5) is actuated by a fork F operated externally by a crank, (not shown) and co-act with three grooved pegs $n$ fixed rigidly to cage $g^1$, the grooves decreasing in depth in the direction towards the cage. On sliding $k$ towards cage $g^1$ the pegs $l$ and $n$ come into contact after a small distance has been traversed, causing cage $g^1$ to rotate through a small angle relative to cam $c^1$, thereby carrying rollers $f^1$ out of their active positions. Three rods $p$ carried in slots on $k$ and passing through holes in $g^1$, $H^1$ and $H^2$, share the longitudinal movement of $k$ and serve the purpose, when $k$ is in its normal position corresponding to clutch "on", of coupling cages $g^1$ and $g^2$ together so that both sets of rollers, when the dimensions of the parts are correctly chosen, are unable to get wedged at the same instant, thereby preventing jamming, as explained above. The holes in $H^2$ and portions of the rods $p$ are square, one side of the holes in $H^2$ being tapered (see Fig. 3$^a$) in order to permit the free passage of the rods $p$ which in their longitudinal movement partake also of the slight angular movement imparted to cage $g^1$ by pegs $l$ and grooved pegs $n$. Notches are cut in these rods $p$ the purpose of which will be clear when the action of the apparatus is being considered; also the purpose of the flat springs $z$ mounted on cage $g^2$ and which press continuously on drum $d$. In operation, assuming member $a$ coupled to a motor which is driving a load coupled to member $e$, the clutch functions as follows:

When member $k$ is in its normal position as shown in Fig. 3, the coupling acts as a bidirectional coupling, and the load is positively locked to the motor, the pegs $l$ and $n$ being out of contact, while cages $g^1$ and $g^2$ are coupled together by the rods $p$.

When member $k$ is slidden towards the cage $g^1$ by operating fork F, one set of rollers, $f^1$, as already explained, is thrown out of action and the load is free to overrun the motor, which can then be stopped or retarded, if desired, and the clutch becomes in effect a "free wheel". In this condition, when the normally driven member $e$ overruns the normally driving member $a$, the cages $g^1$ and $g^2$, which rotate with $e$, revolve faster than the drum $d$. Consequently, owing to the friction of the flat springs $z$ carried on cage $g^2$ rubbing on drum $d$, the cage $g^2$ tends to be carried away from its active position, the amount of such movement being limited by the depth of the notches cut in rods $p$ (Fig. 3$^b$). So long as the driven member over-runs the driving member, the cage $g^2$ (i. e. its plate $H^2$) will butt up against the notches in the pegs $p$ and prevent the return of $k$ to its normal position, even after the fork F has been itself moved back to its normal position (i. e. towards the left in Fig. 3). So that, once the rollers $f^1$ have been thrown out of action by operating fork F, and so long as the driven member over-runs the driving member:—(1) $g^2$ engages with these notches in $p$; (2) the member $k$ is prevented from returning to its normal position (which it would otherwise do under the action of springs $w$); and (3) the rollers $f^1$ continue to be kept out of action. To couple up bidirectionally the motor to the load again, all that is necessary is to allow it to speed up until it overtakes and once more drives the load, whereupon cage $g^2$, through the friction of the springs $z$ on drum $d$, is swung clear of the notches in $p$ and the member $k$ returns to its normal position under the action of the springs $w$, permitting the rollers $f^1$ to assume their active position. A buffer spring $W$ serves to absorb any jar due to the sudden return of $k$ against locating washer $y$.

It is to be noted that bidirectional coupling takes place automatically when driving and driven members are revolving at the same speed and is therefore without shock.

It is to be noted that when the two cages are coupled together again in the normal position of the plate $k$ both cages are influenced by the friction springs $z$, which automatically ensure that either set of rollers take up their active positions according as there tends to be over-running or under-running of the driven member so that the apparatus functions as a true coupling. Theoretically when one set of rollers is in its wedged position the distance between the position of the other set of rollers and the latter's wedged position represents "backlash" between the driving and driven members of the apparatus; but in practice this distance can be made indefinitely small so that in an accurately made apparatus according to this invention "backlash" can be eliminated to such an extent as to be no more than the backlash which exists between two members splined or keyed to one another.

The above apparatus could be used in conjunction with the gear box of an automobile by being assembled between the gear box and back axle, as illustrated in Fig. 6, the same pedal P, which is normally provided to operate the friction transmission clutch being connected through link R with bell-crank $m$ fixed to spindle of fork F, so that it operates also the roller clutch. The link R is so adjusted that on first depressing pedal P, the friction transmission clutch is declutched and on further depressing P, the roller clutch is unidirectionally uncoupled, i. e. one set, $f^1$, of rollers is rendered inoperative thereby converting the roller clutch into a "free-wheel." On fully depressing pedal P the brake-band T (Figs. 4 and 6) connected to the other arm of bell-crank $m$ is tightened, thereby arresting or retarding the motion of all the revolving parts of the gear box. Consequently, even though the automobile may be travelling fast forward, on depressing the pedal P to its full extent, all rotating parts of the gear box are brought to rest, and the gear lever L can be operated and gear changing effected without risk of clashing—in fact no skill being required of the driver of the automobile for this operation. Upon allowing the pedal P to return to its normal position, the brake-band T is loosened, and the friction transmission clutch thrown "in", as usual, but the roller clutch continues to act as a "free wheel" as above described. The car is not locked bidirectionally to the engine, until the latter is speeded up and the driving member $a$ of the roller clutch overtakes and drives the driven member $e$, whereupon the bidirectional property of the roller clutch is automatically restored, and the engine is once more locked to the road wheels of the vehicle. The sequence of operations when depressing the pedal P is:

(1) Friction clutch thrown out of action;

(2) Roller clutch thrown out of action;

(3) Brakeband tightened and movable parts of gear box arrested or retarded.

Reference is now made to Fig. 7 which is a transverse section looking in the direction opposite to that shown in Fig. 4. By comparison with Fig. 4 it is seen that here, one set of rollers is replaced by three wedges X, which serve to drive the automobile in forward drive, and the cam $c^2$ takes a correspondingly altered form. The other cam $c^1$ and rollers $f^1$ remain as in Fig. 4, and are shown through a break in the section through cam $c^2$. The wedges X are carried on pegs $g^2$ mounted on a cage (not shown) which is provided for cam $c^2$, in the same way as in Figs. 3 and 4, the operation being precisely the same.

Apparatus made in accordance with this invention could usefully be employed, among other ways, in combination with marine and aero engines, where occasions arise for disconnecting the propeller from the motor, without bringing the vessel to a standstill. In electrical power plants where the load is at times very great the power from a reserve motor which is normally inactive but coupled by means of the above device to the active motor could be mechanically thrown in to increase the output at such times of "peak" loads.

What I claim and desire to secure by Letters Patent is:—

1. In apparatus for coupling rotary driving and driven members, a device comprising the elements of two unidirectional clutches adapted to act in opposite directions and as a bidirectional coupling, provided with means for unidirectional uncoupling, in combination with means for automatically restoring bidirectional coupling when synchronization between the driving and the driven members is approximately attained.

2. In apparatus for coupling rotary driving and driven members a device comprising the elements of two unidirectional clutches adapted to act in opposite directions and as a bidirectional coupling, said elements comprising a normally driving member, a normally driven member and gripping members associated therewith, said device being adapted to permit the driving and driven members to engage in any relative position of rotation of the one to the other and provided with means for unidirectional uncoupling, in combination with means which operate automatically when the device functions as a bidirectional coupling for preventing the gripping members which transmit effort in one direction from becoming gripped at the same instant as gripping members which transmit effort in the opposite direction together with means for causing each set to grip automatically as the direction of the effort transmitted is varied.

3. In apparatus for coupling rotary driving and driven members a device comprising the elements of two unidirectional clutches adapted to act in opposite directions and as a bidirectional coupling said elements comprising a normally driving member, a normally driven member and gripping members associated therewith, said device being provided with means for unidirectional uncoupling, in combination with means for automatically restoring bidirectional coupling when synchronization between the driving and driven members is attained.

4. In apparatus for coupling rotary driving and driven members, a device comprising the elements of two unidirectional clutches adapted to act in opposite directions and as a bidirectional coupling, said elements comprising a drum shaped member, at least one cam shaped member and gripping members associated therewith, said device being provided with means for unidirectional uncoupling, in combination with means for automatically restoring bidirectional coupling when synchronization between the driving and driven members is attained.

5. In apparatus for coupling rotary driving and driven members, a device comprising the elements of two unidirectional clutches adapted to act in opposite directions and as a bidirectional coupling, said elements comprising a normally driving member, a normally driven member, a number of gripping members in the form of rollers, said device being provided with means for unidirectional uncoupling in combination with means for automatically restoring bidirectional coupling when synchronization between the driving and driven members is attained.

6. In apparatus for coupling rotary driving and driven members, a device comprising the elements of two unidirectional clutches adapted to act in opposite directions and as a bidirectional coupling, the said elements comprising a normally driving member, a normally driven member, a number of gripping members in the form of rollers, said device being provided with means for unidirectional uncoupling in combination with means which operate automatically when the device functions as a bidirectional coupling, for preventing the gripping members which transmit effort in one direction from becoming gripped at the same instant as the gripping members which transmit effort in the opposite direction together with means for causing each set to grip automatically as the direction of the effort transmitted is varied.

7. In apparatus for coupling rotary driving and driven members, a device comprising the elements of two unidirectional clutches adapted to act in opposite directions and as a bidirectional coupling, said elements comprising a normally driving member, a normally driven member and gripping members, in the form of rolling members, associated therewith, together with at least one cage for supporting the said gripping members, said device being provided with means for unidirectional uncoupling in combination with means for automatically restoring bidirectional coupling without shock.

8. In apparatus for coupling rotary driving and driven members, a device comprising the elements of two unidirectional clutches adapted to act in opposite directions and as a bidirectional coupling, said elements comprising a normally driving member, a normally driven member, gripping members associated therewith, two cages adapted to support the gripping members and means for controlling at least one cage so that when one set of gripping members is in action the cage supporting the other set of gripping members is held in such a position as to prevent said gripping members from coming into action, said device being adapted to permit the driving and driven members to engage in any relative position of rotation of the one to the other.

9. In apparatus for coupling rotary driving and driven members, a device comprising the elements of two unidirectional clutches adapted to act in opposite directions and as a bidirectional coupling, said elements comprising a normally driving member, a normally driven member, gripping members associated therewith, two cages adapted to support the gripping members and means for coupling one cage to the other cage so that when one set of gripping members is in action the cage supporting the other set of gripping members is held in such a position as to prevent said gripping members from coming into action, springs in at least one cage adapted to maintain the gripping members in definite positions in their respective cages, said device being adapted to permit the driving and driven members to engage in any relative position of rotation of the one to the other.

10. In apparatus for coupling rotary driving and driven members, a device comprising the elements of two unidirectional clutches adapted to act in opposite directions and as a bidirectional coupling, said elements comprising a normally driving member in the form of a drum, a normally driven member in the form of a cam, a number of gripping members in the form of rollers, two cages adapted to support the gripping members together with means for coupling one cage to the other cage so that when one set of gripping members is in action the cage containing the other set of gripping members is held in such a position as to prevent said gripping members from coming into action.

11. In apparatus for coupling rotary driving and driven members, a device comprising the elements of two unidirectional clutches adapted to act in opposite directions and as a bidirectional coupling, said elements comprising a driving member in the form of a drum, a driven member in the form of a cam, gripping members, two cages adapted to support the gripping members together with a friction coupling between one of the cages and the drum shaped member adapted to cause a limited angular movement between the said cage and the cam shaped member for the purpose of causing the gripping members of the said cage to leave and to return to their operative position, according as the normally driving member does not drive or does drive the normally driven member.

12. In apparatus for coupling rotary driving and driven members, a device comprising the elements of two unidirectional clutches adapted to act in opposite directions and as a bidirectional coupling said elements comprising a driving and a driven member adapted to engage in any relative position of rotation of the one to the other, and gripping members, together with means for unidirectional uncoupling, said means comprising a member slidable longitudinally which in its normal position permits the apparatus to act as a bidirectional coupling while in its advanced and operative position it prevents the gripping members from taking up one of their active positions, in combination with means for automatically restoring bidirectional coupling when synchronization between the driving and the driven members is attained.

13. In apparatus for coupling rotary driving and driven members, a device comprising the elements of two unidirectional clutches adapted to act in opposite directions and as a bidirectional coupling, said elements comprising a driving and a driven member, gripping members, in combination with means for unidirectional uncoupling, together with additional means for restoring bidirectional coupling, said additional means adapted to operate automatically as soon as the normally driving member drives the normally driven member.

14. In apparatus for coupling rotary driving and driven members, a device comprising the elements of two unidirectional clutches adapted to act in opposite directions and as a bidirectional coupling, said elements comprising a driving and a driven member, gripping members, at least one cage, means for unidirectional uncoupling, said means comprising a member slidable longitudinally which in its normal position permits the apparatus to act as a bidirectional coupling, while in its advanced and operative position it co-acts with a cage so as to prevent the gripping members from taking up one of their active positions, and additional means for retaining the longitudinally slidable member in its advanced and operative position so long as the normally driven member overruns the normally driving member and to automatically cause it to return to its normal position as soon as the normally driving member drives the normally driven member.

15. In apparatus for coupling rotary driving and driven members, a device adapted to act as a bidirectional coupling, comprising an abutment member, a cam member, gripping members, at least one cage, a controlling member carried with the cam member and capable of limited angular movement with respect to the member which carries the cam member, a friction coupling between the controlling member and the abutment member together with means for unidirectional uncoupling, said means comprising a member slidable longitudinally which in its normal position permits the apparatus to act as a bidirectional coupling, while in its advanced and operative position it co-acts with a cage so as to prevent the gripping members from taking up one of their active positions, and additional means for retaining the longitudinally slidable member in its advanced and operative position so long as the normally driven member overruns the normally driving member and to automatically cause it to return to its normal position as soon as the normally driving member drives the driven member, the said additional means comprising rods provided with notches carried by the longitudinally slidable member, which notches engage with the controlling member in the operative position of the slidable member, thereby restraining the slidable member from returning to its normal position, until the driving member drives the driven member, whereupon the said controlling member is swung clear of the said notches.

16. In apparatus for coupling rotary driving and driven members a device comprising the elements of a forward and a reverse unidirectional clutch adapted to act as a bi-directional coupling, means for uncoupling the reverse clutch in combination with additional means for automatically restoring bi-directional coupling when synchronization between the driving and driven members has been attained, the said additional means comprising a control member associated with the elements of the forward unidirectional clutch, through which substantially the full forward drive is transmitted.

17. In apparatus for coupling rotary driving and driven members, a device comprising the elements of two uni-directional clutches adapted to act in opposite directions and as a bi-directional coupling, said elements comprising a normally driving member, a normally driven member and gripping members associated therewith, said device being provided with means for uni-directional uncoupling and means for automatically restoring bidirectional coupling when synchronization between the driving and the driven members is attained, in combination with means which operate automatically when the device functions as a bi-directional coupling for preventing the gripping members which transmit effort in one direction from becoming gripped at the same instant as the gripping members which transmit effort in the opposite direction, together with means for causing each set to grip automatically as the direction of the effort transmitted is varied.

18. In an automobile, in combination with the driven member of a gear box, a coupling device comprising the elements of two uni-directional clutches adapted, respectively, to operate in opposite directions and together as a bidirectional coupling, characterized in that the said elements of the two unidirectional clutches are disposed in separate planes, the driving member of the device being associated with the driven member of the gear box so that both the said members are substantially in effect a single member and that the said coupling device transmits the effort which passes through different forward gear ratios as these gear ratios are brought into operation.

19. A coupling device for driving and driven members comprising the elements of a forward unidirectional clutch and a reverse unidirectional clutch, adapted to act together as a bidirectional coupling, means for disengaging the reverse unidirectional clutch, together with means for ensuring synchronization of the speed of the driving and driven members preparatory to the re-engagement of the said reverse unidirectional clutch for the purpose of preventing shock.

20. In apparatus for coupling rotary driving and driven members, a device comprising the elements of a forward uni-directional clutch and a reverse uni-directional clutch adapted to act together as a bi-directional coupling, said elements comprising an abutment member, a cam shaped member, gripping members in the form of rollers, a cage for locating said rollers, means for frictional engagement between the said cage and the abutment member, means for rendering inoperative the reverse uni-directional clutch, in combination with means for automatically restoring the reverse uni-directional clutch to operative condition when the driving member has overtaken the driven member.

21. A coupling device comprising a forward uni-directional clutch with gripping members and a reverse uni-directional clutch with gripping members, the said uni-directional clutches being adapted to act together as a bi-directional coupling, means for preventing both sets of gripping members being wedged simultaneously, in combination with means for rendering inoperative the reverse uni-directional clutch.

In testimony whereof I have signed my name to this specification.

FELIX ALEXANDER JOSEPH.